United States Patent [19]
Erhardt

[11] 3,908,340
[45] Sept. 30, 1975

[54] APPARATUS FOR FEEDING AND APPLYING INDIVIDUAL LIDS TO CONTAINERS

[75] Inventor: Stefan Erhardt, Rockford, Ill.

[73] Assignee: Anderson Bros. Mfg. Co., Rockford, Ill.

[22] Filed: Mar. 25, 1974

[21] Appl. No.: 454,091

[52] U.S. Cl. .................... 53/307; 53/329; 53/373
[51] Int. Cl.². B65B 7/28; B65B 51/14; B65B 51/16
[58] Field of Search ............. 53/307, 329, 373, 290, 53/296, 303, 314, 315; 156/566, 583

[56] References Cited
UNITED STATES PATENTS

| | | | |
|---|---|---|---|
| 3,064,407 | 11/1962 | Logemann et al. | 53/307 |
| 3,283,469 | 11/1968 | McBrady et al. | 53/22 A |
| 3,477,199 | 11/1969 | Keas | 53/307 X |
| 3,487,622 | 1/1970 | Mueller | 53/307 X |
| 3,536,570 | 10/1970 | Holstein | 156/566 |
| 3,540,186 | 11/1970 | Parvin et al. | 53/329 X |
| 3,545,173 | 12/1970 | Christine et al. | 53/329 X |
| 3,619,972 | 11/1971 | Pringle et al. | 53/329 X |
| 3,740,300 | 6/1973 | Heinzer | 156/583 |

Primary Examiner—Travis S. McGehee
Assistant Examiner—Horace M. Culver
Attorney, Agent, or Firm—Morsbach & Pillote

[57] ABSTRACT

An apparatus for feeding individual lids from a stack of lids in a magazine and for applying the lids to containers while the containers are being advanced along a path by a continuously moving conveyor. The lid feeder includes a vacuum cup moved cyclically in timed relation with the advance of the conveyor to withdraw an individual lid from a magazine and move the same downwardly and forwardly in the direction of advance of the containers by the conveyor; a tack sealing mechanism for sealing a portion of the lid to the rim of a container as the vacuum cup moves forwardly with an advancing container, and a lid sealing mechanism for thereafter sealing the lid to the entire rim of the container as the container is advanced past a subsequent lid sealing station. An improved lid feeding apparatus is also disclosed for moving the vacuum cup in an axial direction toward and away from the lowermost lid in a stack to withdraw the lid from the stack, and for moving the vacuum cup generally horizontally in the forward direction of advance of the containers by the conveyor for applying the lid to the moving container.

16 Claims, 5 Drawing Figures

APPARATUS FOR FEEDING AND APPLYING INDIVIDUAL LIDS TO CONTAINERS

BACKGROUND OF THE INVENTION

It is advantageous in many applications to seal containers for foodstuff and the like with a thin foil or film cover. Various different machines have heretofore been made for applying the foil or film in the form of a continuous web to the rims of the containers as they are advanced by a conveyor, and to thereafter cut or trim the cover film to form individual packages. However, some difficulties and waste are encountered in trimming the cover film, particularly when the containers have a nonrectangular configuration or are not positioned closely adjacent to each other on the conveyor. Moreover, when preprinted webs are utilized for the cover film, some difficulties are encountered in maintaining proper registration between the printing on the cover web and the containers.

It has also been proposed, for example as shown in the U.S. Pat. to Christine et al. No. 3,545,173 issued Dec. 8, 1970, to feed individual film or foil lids from a stack and apply them to the container. In order to prevent displacement of the lids from the containers as they were advanced to the subsequent sealing station, apparatus is disclosed in that patent for tack sealing a portion of the lid to the container at the lid-applying station. However, the apparatus disclosed in the aforementioned patent was operable to apply and tack seal lids to the containers only when the containers were stationary. This required stopping of the conveyor during tack sealing of the lids to the containers and markedly reduced the overall speed at which the containers could be sealed.

SUMMARY OF THE INVENTION

The present invention relates to an apparatus for feeding and applying individual lids to preformed containers while the containers are advanced in continuous fashion along a path by a conveyor. The lid applying apparatus includes a vacuum pickup head which is cyclically oscillated in timed relation with the advance of the conveyor between a first position in an upwardly facing attitude for engaging the lowermost lid in a lid magazine to a second position in a downwardly facing attitude at a lid-applying station and back, the operating means being arranged to move the vacuum pickup head in the direction of advance of the containers by the conveyor and at a level adjacent the level of the container rims as the vacuum pickup head approaches its second position in a downwardly facing attitude so that the lids move forwardly with the advancing containers. A tack sealing means is moved in timed relation with the vacuum pickup head downwardly and forwardly to press and tack seal a portion of the lid carried by the pickup head to the rim of the container as the vacuum pickup head moves forwardly with the containers, and a lid sealing mechanism is provided for thereafter sealing the lids to the entire rim of the container as the containers are advanced past the subsequent lid-sealing station.

The thin foil lids are easily dislodged from the containers and tack sealing of the lids to the containers while the lids are still supported by the vacuum pickup head assures proper positioning of the lids on the containers and prevents dislodgement of the lids during retraction of the pickup head or advance of the container to the subsequent sealing station. The foil lids are easily deformed and a guide plate is advantageously provided at the lid-applying station to overly the rims of the containers at a level to engage the lid carried by the vacuum pickup head to straighten deformed lids. The lid-feeding mechanism has an improved linkage arranged for controlling movement of the vacuum pickup head between its lid receiving and lid discharging positions, while avoiding the use of cams which are expensive to manufacture and subject to wear and noise.

An improved object of this invention is to provide an apparatus which will reliably feed and apply individual lids to containers while the containers are in motion and prevent the dislodgement of the lids during transfer to the subsequent lid-sealing station.

Another object of this invention is to provide an apparatus for applying individual foil lids to the upper ends on preformed containers while the containers are in motion and which operates to straighten lids which may become deformed during the feeding of the lids.

Still another object of this invention is to provide an apparatus having a vacuum operated pickup head for withdrawing individual lids from a magazine and for applying the lids to the containers as they are advanced along a path, and which has an improved linkage arrangement for controlling movement of the vacuum pickup head between its lid pickup position and its lid discharge position, and which avoids the use of cam which is subject to wear and noise.

These, together with other features and advantages of this invention will be more readily understood by reference to the following detailed description when taken into connection with the accompanying drawings wherein.

Figure 1:
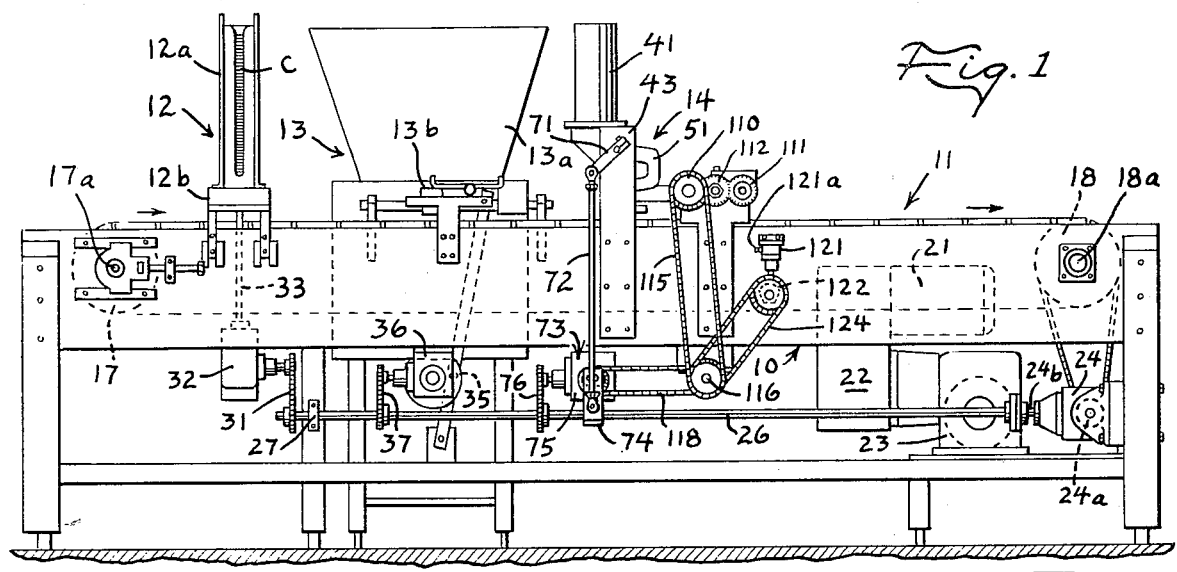
FIG. 1 is a side elevational view of a container dispensing, filling and sealing machine embodying the present invention.

The invention is illustrated in FIG. 1 applied to a packaging machine having a stationary support frame 10, a conveyor 11 for advancing containers C (FIGS. 3–4) in a continuous fashion along a path, a container dispenser 12 operated in timed relation with the advance of the conveyor to dispense containers onto the conveyor, a filler mechanism 13 for filling the containers, and the lid feeding and applying apparatus 14 for applying lids to the containers to seal the same. The conveyor means is arranged to advance the containers in continuous fashion and includes rigid container support frames 15 which are supported on endless chains 16 entrained over inlet and outlet sprockets 17 and 18 respectively mounted by shafts 17a and 18a adjacent opposite ends of the support frame 10. In the embodiment illustrated in FIG. 2, each of the container support frames 15 has a pair of container-receiving openings designated 15a, it being understood that the container support frames could be arranged to handle the single container in each row or a greater number of containers such as 3, 4 or more containers in each row, as desired.

The conveyor is driven to advance the containers in continuous fashion and, as diagrammatically shown in FIG. 1, the drive includes a drive motor 21, a variable speed drive 22, and a speed reducer 23. The output shaft of the speed reducer 23 is connected to the input of a gear box 24 having one output shaft connected through a sprocket 24a, chain 25 to a sprocket on the conveyor drive shaft 18a. The gear box 24 also has a second output shaft 24b connected to a jackshaft 26 that extends longitudinally of the machine and is rotatably supported in a journal 27 on the stationary support frame. The gear box 24 and the sprockets which connect the gear box to the conveyor are arranged in relation to the pitch of the container support frames 15 along the conveyor such that the jackshaft 26 is rotated through one revolution, each time the conveyor is advanced a distance corresponding to the pitch of the container support frames along the conveyor.

The container dispenser 12 can be of any suitable construction which is cyclically operable to dispense containers C from a number of magazines corresponding to the number of containers in each transverse row of openings in the container support frames. In general, the container dispenser includes a number of magazines 12a for storing stacks of containers in an upright condition in alignment with the opening in the container support frames on the conveyor, and a dispensing mechanism 12b which is operable as through a shaft 33 driven through a power take off 31 and gear box 32 from the jackshaft 26, to dispense a container from each of the magazines in timed relation with the advance of the conveyor.

The product dispenser or filler 13 can be of various known types which are operable to dispense product into containers while they are advanced by a conveyor. In general, the dispenser or filler includes a hopper 13a for storing a quantity of the product to be dispensed and a shuttle 13b which is reciprocable lengthwise of the path of travel of the conveyor as by a crank 35 driven as through a gear box 36 and power take off 37 from the jackshaft 26 and which is operable to open dispensing valves and dispense product during the forward stroke of the shuttle and to shut-off of the dispensing valves during the return stroke. Such dispensers commonly fill two transverse rows of containers while advancing forwardly with the containers and then interrupt dispensing during the return stroke of the shuttle. The construction of the container dispenser and filler will vary with different types of containers and different products to be filled and since the details of construction of the dispenser and filler form no part of the present invention, further detailed description and illustration is deemed unneccessary.

The lid applying apparatus 14 is located at a lid-applying station downstream of the filler 13 and is operated in timed relation with the advance of the containers by the conveyor to feed and apply individual lids to the containers while the latter are advanced by the conveyor. The lid feeding and applying apparatus is specifically designed for feeding and applying thin flexible lids of metal foil, plastic film, paper or the like which have or are treated to have a coating on one surface adapted to adhere to the rim of the container. While pressure sensitive adhesives can be utilized, the lids are preferably of the type which have a coating or are formed of material that is bondable or sealable to the containers upon the application of heat. The containers, of course, can be of various different materials including plastic, paper, metal foil or the like.

Figure 2:
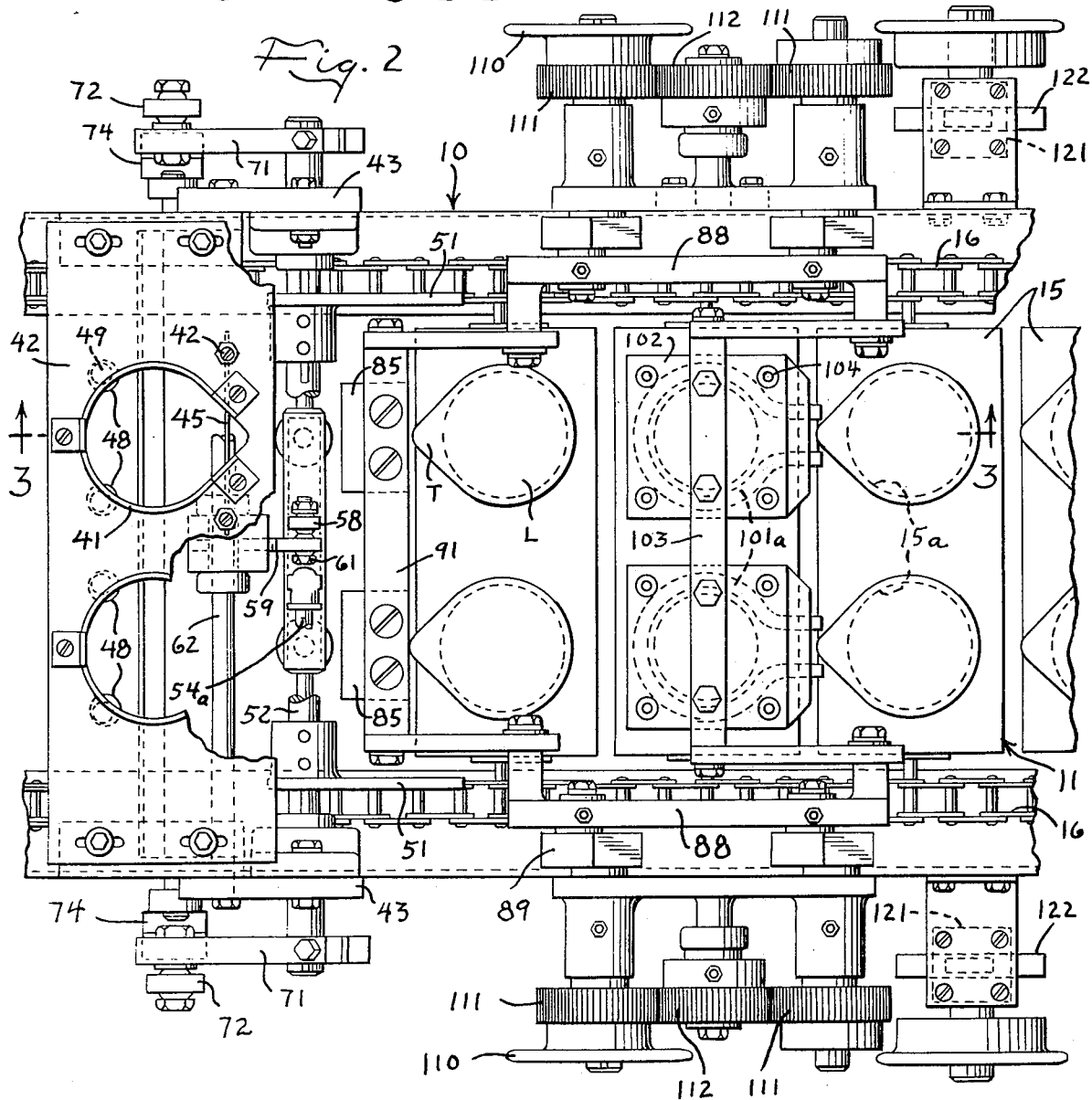
FIG. 2 is a fragmentary plan view on a larger scale than FIG. 1 showing the lid feeding and applying apparatus.

The lid-feeding apparatus includes a number of lid magazines 41 corresponding to the number of openings 15a in each row of openings in the container support frames, which magazines are supported on a cross member 42 attached to a bracket 43 on the stationary support frame 10. The cross member 42 supports the magazines 41 above the conveyor and the magazines are each adapted to receive a stack of inverted lids L (FIG. 3), with a lid support structure provided at the lower end of each magazine for releasably supporting the stack of inverted lids. In the preferred embodiment illustrated, the lid support includes a wire 45 (FIG. 2) that is affixed to the underside of the support member 42 as by fasteners 47, in such a manner that the wire extends cross-wise of the lower end of the magazine adjacent one side thereof, with at least a pair of inwardly projecting ears or tabs 48 located at locations circumferentially spaced from the wire 45 to underlie and support the periphery of the lowermost lid in the stack. In the embodiment illustrated, the lids L have a generally circular periphery with a tab portion T projecting outwardly of the otherwise circular configuration, and the lid magazine has a cross-section corresponding to the configuration of the lid. As shown in FIG. 2, the wire 45 extends across the lower end of the lid magazine in a position to underlie the lid adjacent the juncture of the tab T with the circular portion of the lid L, and the ears 48 underlie the lid at locations spaced from the wire 45. The ears 48 can conveniently be in the form of circular washers having an eccentric opening and fastened to the underside of the support plate as by screws 49 that extend through the eccentric openings and which are adapted to lock the washers 48 in different angularly adjusted positions to control the degree of radial projection of the periphery of the washers 48 into the magazine. The wire 45 and ears 48 thus engage the lowermost lid in the stack of inverted lids in each magazine and support the lids in a manner to allow the lowermost lid to be pulled off the bottom of the stack.

The lid feeder is operated in timed relation with the advance of the conveyor to withdraw the lowermost lid from a respective magazine and move the lid downwardly and forwardly into overlying relation with the containers on the conveyor, and the lid feeder is so arranged as to advance the lid forwardly with the containers on the conveyor, while supporting the same in a downwardly facing position. The lid feeder includes a pair of levers 51 nonrotatably attached to a shaft 52, and which shaft is rotatably supported on the brackets 43 for swinging movement about the horizontal axis of the shaft. The vacuum pickup head includes one vacuum cup 56 for each of the lid magazines and, in the embodiment shown, a pair of vacuum cups 56 are mounted as by tubes 57 on a shaft 54 that is rotatably supported on the outer ends of the levers 51 and extends therebetween. The vacuum cups 56 are laterally offset from the axis of the shaft 54 and are swingable relative to the levers. As shown in FIG. 2, the vacuum cups are spaced apart along the shaft 54 at locations corresponding to the center-to-center spacing between adjacent container receiving openings 15a in the container support frames. Shaft 54 is preferably tubular so as to communicate through tubes 57 with the several vacuum cups 56, and vacuum is selectively applied to the vacuum cups in a manner described more fully hereinafter in timed relation with the movement of the vacuum pickup head.

Figure 3:
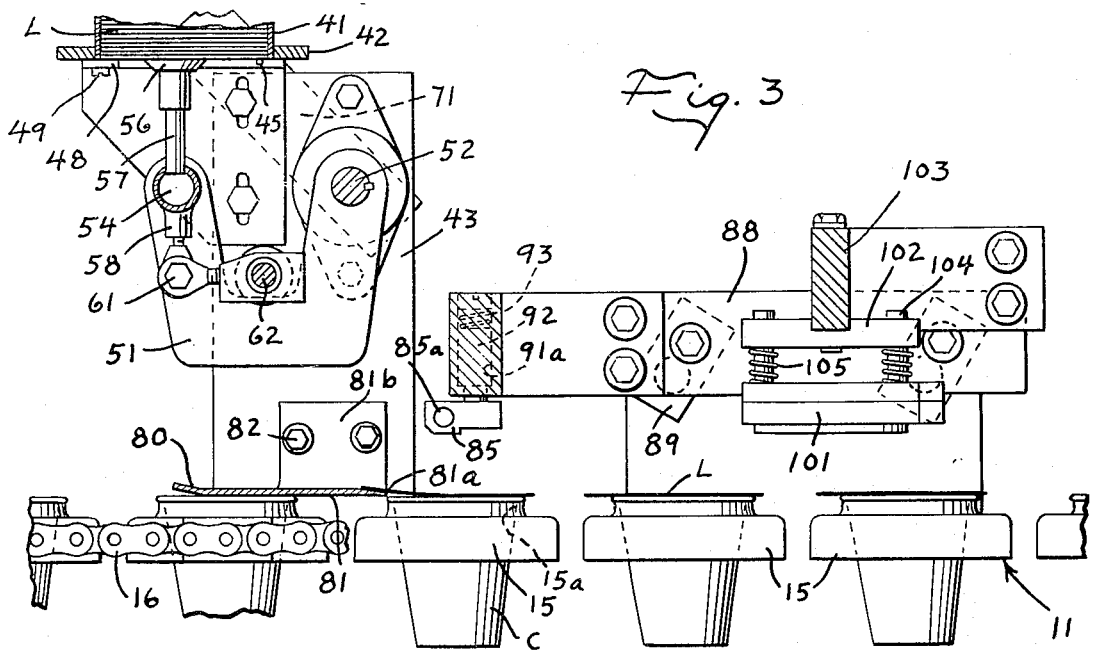
FIGS. 3, 4 and 5 are fragmentary longitudinal sectional views taken on the plane 3—3 of FIG. 2 and illustrating the lid feeding and applying apparatus in different moved positions.
Figure 4:
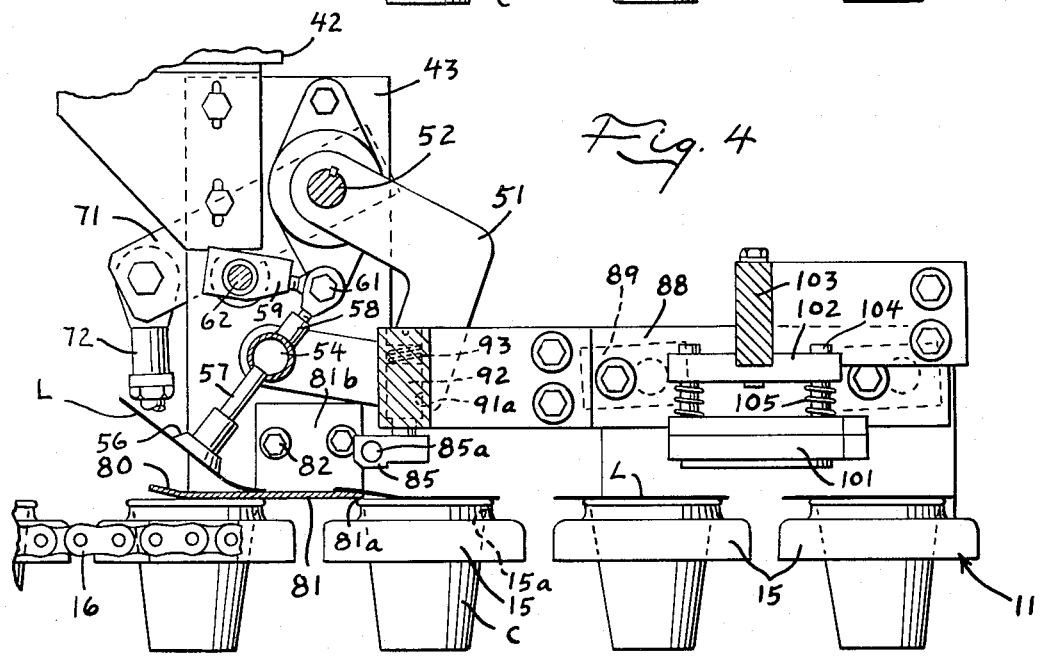
Figure 5:
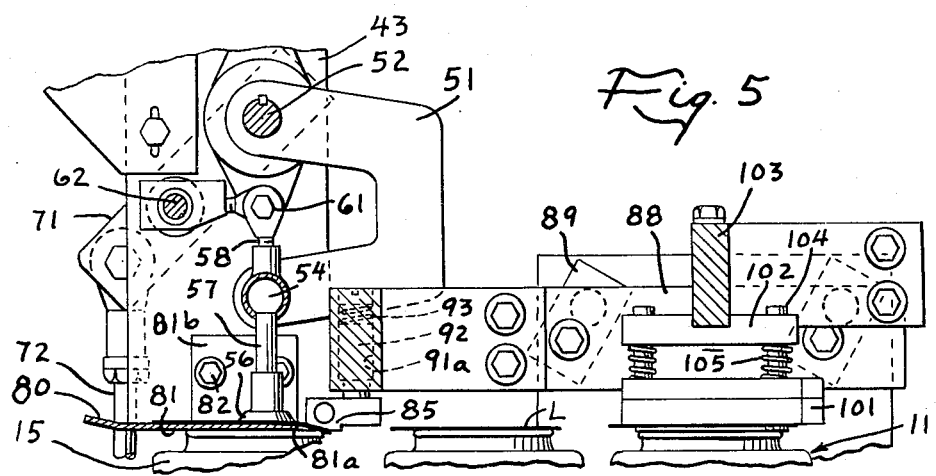

The levers 51 are swingable from a raised position as shown in FIG. 3 in which the pivot axis of the shaft 54 is horizontally offset in a direction opposite the direction of advance of the containers by the conveyor from the axis of the shaft 52, to a lowered position as shown in FIG. 5 in which the axis of the shaft 54 is vertically offset below the axis of the shaft 52. Provision is made for controlling swinging movement of the vacuum pickup head relative to a lever, as the lever moves between its raised and lowered position, to orient the vacuum cup in an upwardly facing attitude and move the vacuum cup in a direction generally axially of the vacuum cup and axially of the stack of lids as the lever moves into and out of its raised position, and to orient the vacuum cup in a downwardly facing attitude and move the vacuum cup in the forward direction of advance of the containers as the levers 51 approach their lowered position, to advance the lid with the containers. This is advantageously achieved by an arm 58 that is rigidly attached to the shaft 54 and a link 59 that is pivotally connected at one end by a pin 61 to the arm 58 and at its other end by a shaft 62 fixed to the stationary support frame. In the embodiment shown, a single arm and link is provided intermediate the ends of the shaft 54 and the shaft 62 is supported at its outer ends in the support bracket 43. As best shown in FIGS. 3–5, the levers 51, arms 58 and link 59 are arranged so that the link extends generally parallel to the plane through the axis of shafts 52 and 54 when the levers are in their raised position shown in FIG. 3, whereby the vacuum cup is moved generally in an axial direction into and out of engagement with the lowermost lid in the magazine as the lever moves into and out of its raised position. In addition, the levers 51, arms 58 and link 59 are arranged so that the link 59 extends generally perpendicular to the plane through the axes of shafts 52 and 54, when the levers approach their lowered position shown in FIG. 5, and with the pivotal connection 61 between the link and the arm located intermediate the shafts 52 and 54 so that the vacuum cup swings in a counterclockwise direction about the pivot pin 61 as the lever swings counter-closkwise about the shaft 52, whereby the vacuum cups 56 move the respective lids in the forward direction of advance of the containers by the conveyor, as the levers approached their lowered position. The above described movements of the vacuum cup when the levers are in its raised position and lowered position is achieved by locating the pivot connection 62 of the link to the support frame at a location spaced below and rearwardly of the shaft 52. In the preferred embodiment illustrated, the length of the arm 58 from the pivot axis 61 to the axis of the shaft 54 is made approximately equal to one-half the spacing between the shafts 52 and 54 and, move-over, the length of the link 59 is also made approximately equal to one-half the spacing between the shafts 52 and 54. With this arrangement, the shaft 62 is vertically spaced below the shaft 52 a distance approximating the distance that the shaft 62 is spaced horizontally from the shaft 52 and this spacing is, in turn, approximately equal to the length of the link between the pivot axis 61 and 62. As shown, the levers 51 have a generally U-shaped configuration to provide clearance for the shaft 62 when the levers are in their raised position.

The levers are oscillated through approximately 90° between their raised and lowered position in timed relation with the advaance of the conveyors as by an arm 71 nonrotatably attached to the shaft 52 and connected as through a link 72 to a cyclical operator 73 driven from the jackshaft 26. In the embodiment shown, cyclical operator includes a crank 74 that is drivingly connected through a gear box 75 and chain and sprocket and chain drive 76 to the jackshaft so that the crank operates through one revolution of the jackshaft, and accordingly rotates through one revolution each time the conveyor is advanced a distance corresponding to the pitch of the container support frames along the conveyor. If desired, a cam could be utilized in lieu of the crank 75 to oscillate the link 72 and arm 71 for moving the feed mechanism between its raised and lowered positions.

The thin flexible lids are frequently deformed or distorted as they are withdrawn from the lid magazine by the vacuum cup 56 and a lid-guide plate 80 is provided at the lid-applying station in the path of travel of the lids as they are moved by the vacuum cup in a manner to tend to flatten and straighten deformed lids. The lid-guide plate includes a generally flat portion 81 that closely overlies the path of travel of the rims of the containers on the conveyor and which has a trailing edge 81a located such that the lead portion of the lid projects forwardly beyond the trailing edge 81a of the guide plate, when the levers 51 are in their lowered position as shown in FIG. 5. As shown, the ends of the lid-guide plate are formed with upturned brackets 81b that are conveniently attached as by fasteners 82 to the support brackets 43 on the stationary support frame.

The thin lids are light weight and easily displaced from the containers and provision is made for tack sealing the lead portion of the lids to the rims of the containers at the lid-applying station while the lids are advanced by the grippers with the containers. For this purpose, a tack sealing head 85 is mounted for movement in a closed loop course in timed relation with the movement of the lid feeder, and is moved downwardly and forwardly in a path adjacent the trailing edge of the guide plate 81 to press and tack seal the lead portion of the lid to the rim of the container as the vacuum cup moves the lid forwardly with the containers. The tack sealing head 85 is advantageously mounted for movement in an orbital path and, as shown, side members 88 are supported each side of the path of travel at the conveyor on cranks 89 spaced apart lengthwise of the conveyor for movement in an orbital path, and the tack sealing head 85 is mounted for limited vertical lost-motion on a cross member 91 attached to the longitudinally extending side members 88. The tack sealing head 85 preferably includes individual sealing bars for each of the containers in a row, and each sealing bar has a headed piston 92 slidably supported in a stepped bore 91a in the cross member 91. The tack sealing bars are yieldably biased to a lowered position in which the head on the piston 92 engages a shoulder in a bore 91a by a spring 93, and the spring is adapted to yield when the tack sealing bar presses the lid against the container rim to limit the sealing pressure and allow the sealing bar to move with the containers at the level of the container rim. The tack sealing bar is timed so as to move downwardly and forwardly to press and tack seal the lead portion of the lid against the container rim while the lid is held by the vacuum cup. Thus, the lid is tack sealed to the rim of the container before the vacuum cup releases the lid to prevent dislodging of the lid from the container during retraction of the vacuum cup and advance of the container to the subsequent sealing station.

Provision is made for completing the seal of the lid to the rim of the container. In the present embodiment wherein the tack sealing means is supported for movement in an orbital path, the lid sealing means is preferably in the form of a platen type sealing head supported for movement with the longitudinal side member 88 in an orbital path at a lid-sealing station downstream of the lid-applying station. As shown, individual platen type sealing heads 101 are provided for each of the container pockets in a row and the heads 101 are supported for limited vertical lost-motion on plates 102 attached to cross member 103 on the longitudinal side members 88. The plate type sealing heads 101 are supported by bolts 104 on the plates 102 for limited vertical movement relative thereto and are yieldably biased to a lowered position by springs 105. Thus, the platen type sealing heads 101 are also moved in an orbital path and are spaced forwardly from the tack sealing head 85 a distance to engage and seal the lid to one container while the tack sealing head is tack sealing the lead portion of the lid at the applying station to a subsequent container. The pair of cranks 89 at each side of the path of travel of the conveyor are drivingly interconnected to move in synchronism with each other by idler gears 112 that mesh with gears 111 on the crank shafts and the cranks at opposite sides of the conveyor are interconnected through a cross shaft 116 and chains 115 that engage sprockets 110 on the crankshafts. Cross shaft 116 is driven in timed relation with the levers 51 through a chain drive 118 connected to the output shaft of gear box 75. The size of the sprockets and gears are selected so as to rotate the sprockets 110 through one revolution each time the jackshaft 26 is rotated through one revolution and while the conveyor is advanced a distance corresponding to the pitch of the container support frames therealong, so as to move the tack sealing head and platen type sealing heads through one complete orbit each time the conveyor advances one pitch.

The lids are preferably heat sealed to the rims of the containers and, as previously described, are either formed of a suitable heat sealable material or have a suitable heat sensitive coating which is operative, when heated, to effect a seal to the rims of the containers. As shown, heating elements 85a and 101a are provided in the tack sealing head 85 and platen type sealing head 101 respectively to heat the same. Thermostats or the like are conveniently provided in the respective sealing heads to control energization of the heaters to maintain a selected heat sealing temperature.

The vacuum applied to the vacuum cups is controlled in timed relation with the movement of the arms as by a valve 121 (FIG. 1) operated by a cam 122 driven in timed relation with the advance of the conveyor. As shown, cam 122 is connected through a sprocket and chain drive 124 to the cross shaft 116. The cam 122 is timed with the movement of the lever arms 51 so as to interrupt vacuum to the vacuum cups 56 after the tack seal head 85 has tack sealed the lead portion of the lids to the container rims. Valve 121 has a hose fitting 121a connected through a flexible hose (not shown) to a hose fitting 54a (FIG. 2) on the shaft 54 and the valve is arranged to either vent the cups to atmosphere when the vacuum is shut off or even apply a slight superatmospheric pressure to aid in disengaging the lid from the vacuum cups, and the cam operates to reapply the vacuum to the cup as the cups move back toward their raised position so as to grip a succeeding lid from the magazine.

From the foregoing it is thought that the construction and operation of the apparatus will be readily understood. The conveyor operates to advance containers in continuous fashion from the container dispenser past the filler when they are filled and sequentially past the lid applying and lid-sealing stations. The lid feeding apparatus 14 operates in timed relation with the movement of the containers on the conveyor to pick up a lid from the magazine and move the lid downwardly and then forwardly in the direction of advance of the containers and at a speed correlative with the speed of the containers. While the lid feed mechanism is moving the lids forwardly with the containers, the tack sealing head moves downwardly and forwardly to press and seal the lead portion of the lid to the container rim as shown in FIG. 5. At the same time, a preceding container having a lid tack sealed thereto is passed under the platen type sealing head at the lid sealing station to have the lid completely sealed to the container rim. The guide plate 81 is disposed in the path of travel of the lids as they move to the lid-applying station and tends to straighten or flatten the lids prior to tack sealing of the same to the containers.

The embodiments of the invention in which an exclusive property or privilege is claimed are defined as follows:

1. An apparatus for applying individual lids to the upper rims in preformed containers comprising, a support frame, conveyor means on said support frame for advancing preformed containers in continuous fashion in a forward direction along a path past a lid applying station, a lid magazine for storing a stack of inverted lids adjacent said lid applying station, lid feed means for removing individual lids from the stack and for applying the lids to the containers while they are advancing along the path, said lid feed means including lever means mounted to said support frame for swinging movement about a first horizontal axis spaced in said forward direction from the lid magazine, a gripper head mounted on said lever means for swinging movement relative thereto about a second horizontal axis spaced from said first axis, a vacuum cup mounted on said head at a location laterally offset from said second axis, means operated in timed relation with the conveyor means for cyclically swinging said lever means from a raised position in which said second axis is below said lid magazine and laterally offset generally horizontally from said first axis downwardly and forwardly to a lowered position in which said second axis is generally vertically below said first axis and back to said raised position, and means including an arm connected to said head and a link pivotally connected at one end to said arm for swinging said head relative to said lever means about said second axis as said lever means moves between said raised and lowered positions, said lever means, arm and link being constructed and arranged to orient the vacuum cup in a upwardly facing attitude and move the vacuum cup in a direction generally axially of the cup as the lever means moves into and out of its raised position and to orient the vacuum cup in a downwardly facing attitude and move the vacuum cup in said forward direction at a level adjacent the tops of the container as the lever means approaches said lowered position, and means for controlling application of vacuum to the vacuum cup in timed relation with its movement.

2. An apparatus for applying lids according to claim 1 wherein said link extends generally parallel to a plane through said first and second horizontal axes when said lever means is in said raised position and said link extends generally perpendicular to a plane through said first and second axes when said lever means is in said lowered position.

3. An apparatus for applying lids according to claim 2 wherein said pivotal connection of the link to the fixed support frame is at a location radially inwardly of said second axis on said lever means when the lever means is intermediate said raised and lowered positions.

4. An apparatus for applying lids according to claim 3 wherein the length of said link between its pivotal connection to said support frame and its pivotal connection to said arm is substantially equal to the distance between the pivotal connection to said arm to said link and said second horizontal axis.

5. An apparatus for applying lids according to claim 4 wherein the distance between the pivotal connection of said arm to said link and said link and said second horizontal axis is approximately one-half the spacing between said first and second horizontal axes.

6. An apparatus for applying lids according to claim 1 including tack sealing means at said lid applying station, means for moving said tack sealing means in timed relation with the movement of said vacuum cup downwardly and forwardly to press and tack seal a portion of a lid carried by the vacuum cup to the rim of a container as the vacuum cup is moved in a downwardly facing attitude in said forward direction at a level adjacent the tops of the containers.

7. An apparatus for applying lids according to claim 6 including a lid guide plate having a portion overlying the path of travel of the containers at a level to engage a lid carried by the vacuum cup as the latter is moved in said forward direction, the lid guide plate and the lid feed means being arranged so that a portion of the lid carried by the vacuum cup projects forwardly of the lid guide plate when the lever means is in said lowered position, and said tack seal means being movable in a path adjacent the forward edge of the guide plate to press the forwardly projecting portion of the lid against the container while the other portion of the lid overlies the guide plate.

8. An apparatus for applying lids according to claim 6 wherein said tack sealing means, includes a heater operative to heat seal the lids to the containers.

9. An apparatus for applying individual flat foil lids to the upper rims on preformed containers comprising a support frame, conveyor means on the support frame for advancing preformed containers in continuous fashion in a forward direction along a path sequentially past a lid applying station and a lid sealing station, a lid magazine for storing a stack of inverted lids adjacent said lid applying station, vacuum operated gripper means, operating means for cyclically moving said vacuum operated gripper means from a first position in an upwardly facing attitude for engaging the lowermost lid in the magazine to a second position in a downwardly facing attitude at said lid applying station and back to said first position, said operating means including means for moving said gripper means in said forward direction and at a level adjacent the level of the container rims as the gripper means approaches said second position in a downwardly facing attitude, tack sealing means at said lid applying station, means operated in timed relation with the movement of said gripper means for moving said tack sealing means downwardly and forwardly as said gripper means moves forwardly toward said second position to press and tack seal a portion of a lid carried by the vacuum operated gripper means to the rim of a container, means for controlling application of vacuum to the vacuum operated gripper means to apply and interrupt vacuum to the gripper means in timed relation with its movement, and lid sealing means at the lid sealing station for sealing the lid to the entire rim of the container as the containers are advanced past the lid sealing station, a lid guide plate having a portion overlying the path of travel of the rims on the containers at a level to engage a lid carried by the vacuum operated gripper means as the latter moves toward said second position thereof, said lid guide plate and said vacuum operated gripper means being so constructed and arranged that the lid carried by the gripper means projects forwardly beyond the lid guide plate when the gripper means is in said second position and said tack sealing means being arranged to tack seal the forwardly projecting portion of the lid to the container rim.

10. An apparatus for applying individual lids to the upper rims on preformed containers comprising a support frame, conveyor means on the support frame for advancing preformed containers in continuous fashion in a forward direction along a path sequentially past a lid applying station and a lid sealing station, a lid magazine for storing a stack of inverted lids adjacent said lid applying station, vacuum operated gripper means, operating means for cyclically moving said vacuum operated gripper means from a first position in an upwardly facing attitude for engaging the lowermost lid in the magazine to a second position in a downwardly facing attitude at said lid applying station and back to said first position, said operating means including means for moving said gripper means in said forward direction and at a level adjacent the level of the container rims as the gripper means approaches said second position in a downwardly facing attitude, tack sealing means at said lid applying station, means operated in timed relation with the movement of said gripper means for moving said tack sealing means downwardly and forwardly as said gripper means moves forwardly toward said second position to press and tack seal a portion of a lid carried by the vacuum operated gripper means to the rim of a container, means for controlling application of vacuum to the vacuum operated gripper means to apply and interrupt vacuum to the gripper means in timed relation with its movement, and lid sealing means at the lid sealing station for sealing the lid to the entire rim of the container as the containers are advanced past the lid sealing station, said operating means including lever means mounted on said support frame for swinging movement about a first horizontal axis spaced in said forward direction from said lid magazine, a gripper head mounted on said lever means for swinging movement relative thereto about a second horizontal axis spaced from said first horizontal axis, said vacuum operated gripper means including a vacuum cup mounted on said head at a location laterally offset from said second axis, means for cyclically swinging said lever means from a raised position in which said second axis is offset generally horizontally from said first axis downwardly and forwardly in the direction of advance of the conveyor to a lowered position in which said second axis is generally vertically below said first axis and back to said raised position, and means including an arm connected to said head and a link pivotally connected at one end to said arm and at the other end to said stationary support frame for swinging said head relative to said lever means about said second axis as said lever means moves between said raised and lowered position, said lever means and arm and link being constructed and arranged to orient the vacuum cup in an upwardly facing attitude and move the cup in a direction generally axially of the cup as the lever means moves into and out of its raised position and to orient the vacuum cup in a downwardly facing attitude and move the cup in said forward direction at a level adjacent the rims on the containers as the lever means approaches said lowered position.

11. An apparatus for applying lids according to claim 10 wherein the pivotal connection of said link to said arm is disposed intermediate said first and second horizontal axes when said lever means is adjacent said lowered position thereof.

12. An apparatus for applying lids according to claim 10 wherein said link extends in said forward direction from its pivotal connection to said support frame when said lever means is in its lowered position and extends in a direction opposite said forward direction from its pivotal connection to the frame when the lever means is in said raised position.

13. An apparatus for applying lids according to claim 10 wherein said link extends generally parallel to a plane through said first and second horizontal axes when said lever means is in said raised position and said link extends generally perpendicular to a plane through said first and second axes when said lever means is in said lowered position.

14. An apparatus for applying individual lids according to claim 13 wherein said pivotal connection of the link to the fixed support frame is at a location radially inwardly of said second axis on said lever means when the lever means is intermediate said raised and lowered positions.

15. An apparatus for applying individual lids according to claim 14 wherein the length of said link between its pivotal connection to said support frame and its pivotal connection to said arm is substantially equal to the distance between the pivotal connection to said arm to said link and said second horizontal axis.

16. An apparatus for applying individual lids according to claim 15 wherein the distance between the pivotal connection of said arm to said link and said second horizontal axis is approximately one-half the spacing between said first and second horizontal axes.

* * * * *

UNITED STATES PATENT OFFICE
CERTIFICATE OF CORRECTION

PATENT NO. : 3,908,340
DATED : September 30, 1975
INVENTOR(S) : Stefan Erhardt

It is certified that error appears in the above-identified patent and that said Letters Patent are hereby corrected as shown below:

Claim 5, column 9, line 28, delete "and said link".

*Signed and Sealed this*

*twenty-third* Day of *December 1975*

[SEAL]

Attest:

RUTH C. MASON
*Attesting Officer*

C. MARSHALL DANN
*Commissioner of Patents and Trademarks*